United States Patent
Dubreil et al.

(10) Patent No.: US 10,409,707 B2
(45) Date of Patent: Sep. 10, 2019

(54) METHODS AND SYSTEMS FOR ANALYZING ANNOTATED PROGRAMMING CODE

(71) Applicant: Facebook, Inc., Menlo Park, CA (US)

(72) Inventors: Jeremy Emilien Georges Dubreil, Foster City, CA (US); Samuel Howard Blackshear, Orinda, CA (US)

(73) Assignee: Facebook, Inc., Menlo Park, CA (US)

( * ) Notice: Subject to any disclaimer, the term of this patent is extended or adjusted under 35 U.S.C. 154(b) by 268 days.

(21) Appl. No.: 15/268,054

(22) Filed: Sep. 16, 2016

(65) Prior Publication Data

US 2018/0081783 A1 Mar. 22, 2018

(51) Int. Cl.
*G06F 11/36* (2006.01)
*G06F 11/34* (2006.01)

(52) U.S. Cl.
CPC ...... *G06F 11/3612* (2013.01); *G06F 11/3476* (2013.01)

(58) Field of Classification Search
CPC .................................................. G06F 11/3612
See application file for complete search history.

(56) References Cited

U.S. PATENT DOCUMENTS

| | | | | |
|---|---|---|---|---|
| 8,578,347 | B1 * | 11/2013 | Carrick | G06F 11/3409 717/104 |
| 2002/0112201 | A1 * | 8/2002 | Flanagan | G06F 9/44589 714/42 |
| 2004/0205742 | A1 * | 10/2004 | Das | G06F 8/433 717/155 |
| 2007/0180441 | A1 * | 8/2007 | Ding | G06F 8/71 717/163 |
| 2009/0328002 | A1 * | 12/2009 | Lin | G06F 11/3604 717/120 |
| 2014/0237604 | A1 * | 8/2014 | Guarnieri | G06F 21/577 726/25 |

(Continued)

OTHER PUBLICATIONS

Cristiano Calcagno, et al., "Compositional Shape Analysis by means of Bi-Abduction," Journal of the ACM, vol. 58, No. 6, Article No. 26, accessed at https://dl.acm.org/citation.cfm?id=2049700, Dec. 2011, 73 pages.

(Continued)

*Primary Examiner* — Wei Y Zhen
*Assistant Examiner* — Amir Soltanzadeh
(74) *Attorney, Agent, or Firm* — FisherBroyles, LLP

(57) ABSTRACT

Exemplary methods, apparatuses, and systems for analyzing annotated programming code are detailed. For example, in an embodiment, a computer-implemented method comprises parsing code to identify a plurality of functions. For each function in the plurality of functions, the method further comprises determining a first annotation associated with the function and determining a second annotation associated with a first sub-function called by the function. The method further comprises generating an error message in an annotation summary for the function in response to determining that the first annotation associated with the function specifies the function as the first code type and the second annotation associated with the first sub-function called by the function specifies the first sub-function as the second code type.

20 Claims, 5 Drawing Sheets

```
@performancecritical 302
void bar() {
    foo()
...
}

@expensive 304
object foo() {
...
}
```

← 300

(56) References Cited

U.S. PATENT DOCUMENTS

2016/0182553 A1* 6/2016 Tripp ................. H04L 63/1433
726/25
2017/0147336 A1* 5/2017 Medlyn .................... G06F 8/73

OTHER PUBLICATIONS

Cristiano Calcagno, et al., "Moving Fast with Software Verification," NASA Formal Methods, NFM 2015, Lecture Notes in Computer Science, vol. 9058, accessed at https://link.springer.com/chapter/10.1007/978-3-319-17524-9_1, Apr. 8, 2015, 14 pages.

* cited by examiner

```
@performancecritical 302
void bar() {
        foo()
...
}

@expensive 304
object foo() {
...
}
```

FIG. 3A

```
@performancecritical 312
object bar() {
        baz()
...
}

@free 314
object baz () {
        foo()
...
}

@expensive 316
object foo() {
...
}
```

FIG. 3B

```
322
class SuperClass {
    void bar()  324
...
}

326
class SubClass extends SuperClass {
    @expensive void bar()  328
...
}
```

METHODS AND SYSTEMS FOR ANALYZING ANNOTATED PROGRAMMING CODE

FIELD

The various embodiments described herein relate to the analysis of annotated programming code. In particular, embodiments analyze functions and sub-functions that may be called by each function to determine whether function calls introduce errors or other issues into the programming code.

BACKGROUND

Programming code includes various functions, which can contain function calls to other functions within the programming code (e.g., sub-functions). Problems can be created within programming code when functions call sub-functions that effect the performance of the computer system running the programming code. For example, a function call may result in an allocation of memory, or other system resource, beyond that which is allowed by or appropriate for the computer system or programming code.

SUMMARY OF THE DESCRIPTION

Exemplary methods, systems, and apparatuses for analyzing annotated programming code are detailed.

In one embodiment, a server computer parses programming code to identify annotations associated with each function within the programming code. Based on the definition of the annotations, the server computer analyzes each function and each sub-function that may be called by the function to determine whether the function calls introduce any errors or other issues into the programming code. Annotation summaries are generated for each function that includes a mapping to all sub-functions called by the function, as well as indications of any issues caused by the sub-function calls of the function. For example, a function designated as performance critical may include a sub-function call to a sub-function that is designated as expensive (e.g., having memory allocation requirements above a threshold or target range). The sub-function call to an expensive sub-function by a performance critical function may be flagged with an error or warning message for programmer review and potential correction. In some embodiments, annotation summaries are aggregable such that when a function calls a sub-function, information contained in an annotation summary for the sub-function may be included in a modified annotation summary for the function.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which:

FIGS. 3A-C illustrate exemplary annotated programming code for analysis by the system.

DETAILED DESCRIPTION

Systems that analyze programming code benefit from techniques that improve the ability to determine problematic function calls within the programming code without the need to execute the programming code. Embodiments describe analyzing programming code containing annotated functions, where the annotations categorize the functions. For example, some functions may be annotated as "performance critical," "expensive," or "free." In such an example, a performance critical function calling an expensive function may generate an error or warning, while the same performance critical function calling a free function may not generate an error or warning.

In the following description, numerous specific details are set forth. However, it is understood that embodiments of the invention may be practiced without these specific details. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
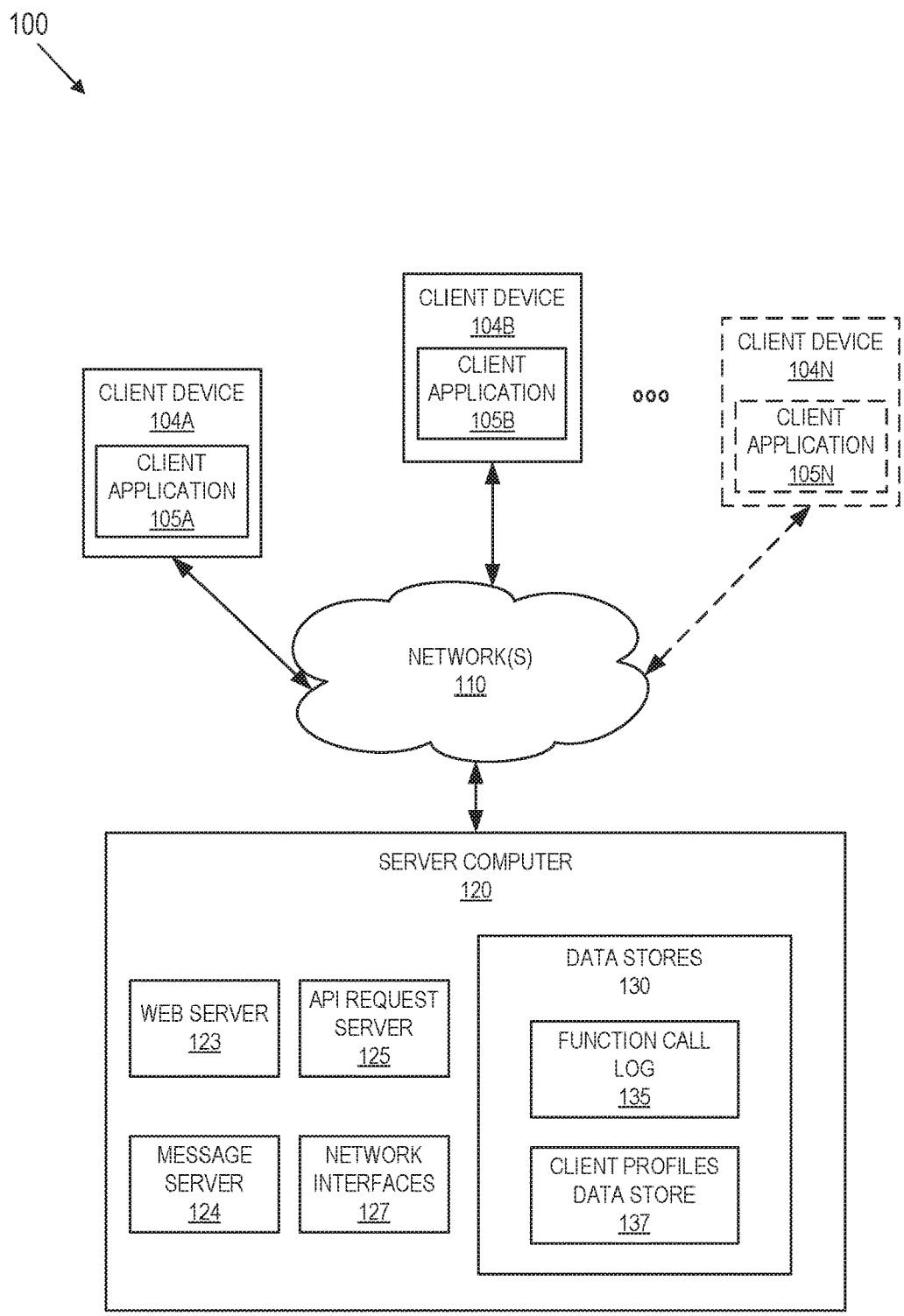
FIG. 1 illustrates an example network environment of a system including a server computer configured to perform annotated programming code analysis.

FIG. 1 illustrates an example network environment of a system 100 that offers client devices 104A-104N the ability to communicate and interact with server computer 120 configured to perform annotated programming code analysis according to an embodiment of the invention. In some embodiments, server computer 120 comprises one or more computing devices. Alternatively, the system may include a computing device other than a server, e.g., as described with reference to FIG. 4, that implements embodiments set forth herein.

Client devices 104A-104N that are enabled to interact with server computer 120 can be any type of computing device capable of receiving user input as well as transmitting and/or receiving data via a network (e.g., network 110). For example, client devices 104A-104N can include conventional computer systems, such as a desktop or laptop computer, or may include devices having computer functionalities such as Personal Digital Assistants (PDA), cellular or mobile telephones, smart-phones, gaming devices, or other electronic devices programmed to implement one or more embodiments set forth herein.

In one embodiment, a client device (e.g. 104A) may execute a client application (e.g. 105A) allowing a user of client device 104A to interact with server computer 120. For example, client application 105A may be a web browser application (e.g., Microsoft Windows Internet Explorer, Mozilla Firefox, Apple Safari, Google Chrome, Opera, etc.). In such embodiments, client application 105A can access server computer 120 via a uniform resource location (URL) for transmission of programming code to server computer 120. In some embodiments, client application 105A is a special-purpose client application. In some embodiments, client application 105A is the native operating system of client device 104A, such as Windows®, Mac OSX®, IOS®, or ANDROID™, which may utilize an Application Programming Interface (API) to directly interface with server computer 120 through API request server 125. Client application 105A can provide additional functionalities, including allowing the user of client device 104A to perform code editing.

Client devices 104A-104N are configured to communicate with server computer 120 via network 110 or collection of networks—such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. Network 110 may be wired, wireless, or a combination of both. In one embodiment, network 110 uses standard communications technologies and/or protocols. Thus, network 110 may include links using technologies such as Ethernet, Institute of Electrical and Electronics Engineers (IEEE) 802.11, Worldwide Interoperability for Microwave Access (WiMAX), 3G, 4G, Long Term Evolution (LTE), Code-Division Multiple Access (CDMA), Digital Subscriber Line (DSL), cable modems, etc. Similarly, the networking protocols used on network 110 may include Multiprotocol Label Switching (MPLS), Transmission Control Protocol (TCP), Internet Protocol (IP), TCP/IP, User Datagram Protocol (UDP), Hypertext Transport Protocol (HTTP), Simple Mail Transfer Protocol (SMTP), and/or File Transfer Protocol (FTP). Data exchanged over network 110 may be represented using technologies and/or formats including Hypertext Markup Language (HTML), Extensible Markup Language (XML), or JavaScript Object Notation (JSON), among other formats. In addition, all or some of links can be encrypted using conventional encryption technologies such as Secure Sockets Layer (SSL), Transport Layer Security (TLS), or Internet Protocol security (IPsec).

Server computer 120 receives and parses programming code received from one or more client device 104A-104N. Based on data in stored client profiles, server computer 120 analyzes the received programming code to identify errors and potential issues within the programming code caused by function calls made by functions. To analyze the programming code, server computer 120 evaluates one instance of each function in the programming code. An annotation summary is generated and stored for each function. As server computer 120 analyzes a function, it further determines whether an annotation summary is stored for the function. When there is an annotation summary stored for a function, server computer retrieves and uses the stored annotation summary. This conserves computing resources by reducing the amount of analyses server computer 120 performs when the function was previously analyzed.

To provide these functionalities, the embodiment of server computer 120 includes web server 123, message server 124, API request server 125, network interfaces 127, and a set of data stores 130. This embodiment also includes, within data stores 130, a function call log 135 and a client profiles data store 137. In other embodiments, server computer 120 may include additional, fewer, or different modules for various applications. Of course, conventional components such as processors, memories, security mechanisms, load balancers, failover servers, management and network operations consoles, and the like are not shown in FIG. 1 so as to not obscure the details of the system.

The web server 123 links the server computer 120 via the network 110 to one or more client devices 104A-104N by accepting requests from the client devices 104A-104N and/or transmitting web pages or other web-related content to the client devices 104A-104N. Web server 123, in some embodiments, is configured to utilize a set of one or more network interfaces 127 to send and receive messages across network 110. In some embodiments, web server 123 (additionally or alternately) utilizes message server 124 (e.g., a dedicated server end station, a dedicated software application, etc.) to communicate with client devices 104A-104N, which is operative to send and/or receive messages, including the results of the evaluation of the programming code by server computer 120.

API request server 125 allows client applications 105A-105N of client devices 104A-104N to access information from or transmit information to server computer 120 by issuing API calls. The information provided by server computer 120 may include the results of an analysis of annotated programming code received from the corresponding client devices 104A-104N. For example, a client device (e.g. client device 104A) may send an API request to server computer 120 via the network 110 to analyze annotated programming code to determine what errors or potential issues, if any, are present in the annotated programming code. API requests are received at server computer 120 by the API request server 125, which then processes the request by performing actions sought by the API requests, determining appropriate responses to the API requests, and transmitting back these responses back to the client device 104A via the network 110.

Data stores 130 store data associated with client profiles and annotation summaries for functions analyzed by server computer 120. In some embodiments, function call log 135 is a data structure configured to store annotation summaries for a plurality of functions analyzed by server computer 120. Function call log 135 may be accessed by server computer 120 and queried using a function label (e.g., name). When an annotation summary having a matching function label is located in function call log 135, server computer 120 retrieves the annotation summary from function call log 135. In addition, server computer 120 may store new annotation summaries or modified annotation summaries, generated in response to the analysis of annotated programming code, to function call log 135. The annotation summaries stored in function call log 135 may be organized by set of one or more programs, code type (e.g., all source functions are sorted together), by function label (e.g., alphabetically by function names), or by any other appropriate means as would be understood by one or ordinary skill in the art. In some embodiments, an annotation summary for a function includes identification information for the function, including a function label, location(s) of the function within the programming code, sub-function calls made by the function, a listing of any errors or performance issues detected for the functions, locations within the code where the errors or performance issues are located within the code, and additional information.

In some embodiments, annotation summaries are aggregable such that when a function calls a sub-function, information contained in an annotation summary for the sub-function may be included in the annotation summary for the function. For example, the annotation summary of the function is modified to include the contents of the annotation summary for the sub-function. This provides a benefit of not requiring additional analysis or retrieval of the annotation summary for the sub-function if there is a later instance of the function calling the sub-function. Thus, each function within the programming code need only be analyzed once by server computer 120.

Server computer 120 stores client profiles in the client profiles data store 137. A client profile includes information about a client that was explicitly provided by the client, in addition to information inferred or determined by server computer 120. In one embodiment, a client profile includes multiple data fields, each data field describing one or more attributes of programming code associated with the client. The client profile includes a set of client-defined programming code annotations, including the labels (e.g., names) for each of the annotations in the set of client-defined programming code annotation. The client profile also includes data indicating the corresponding code types for each of the programming code annotations. For example, the client-defined annotations specify one or more annotations as a source-type annotation, a sink-type annotation, and a sanitizer-type annotation.

Figure 2:
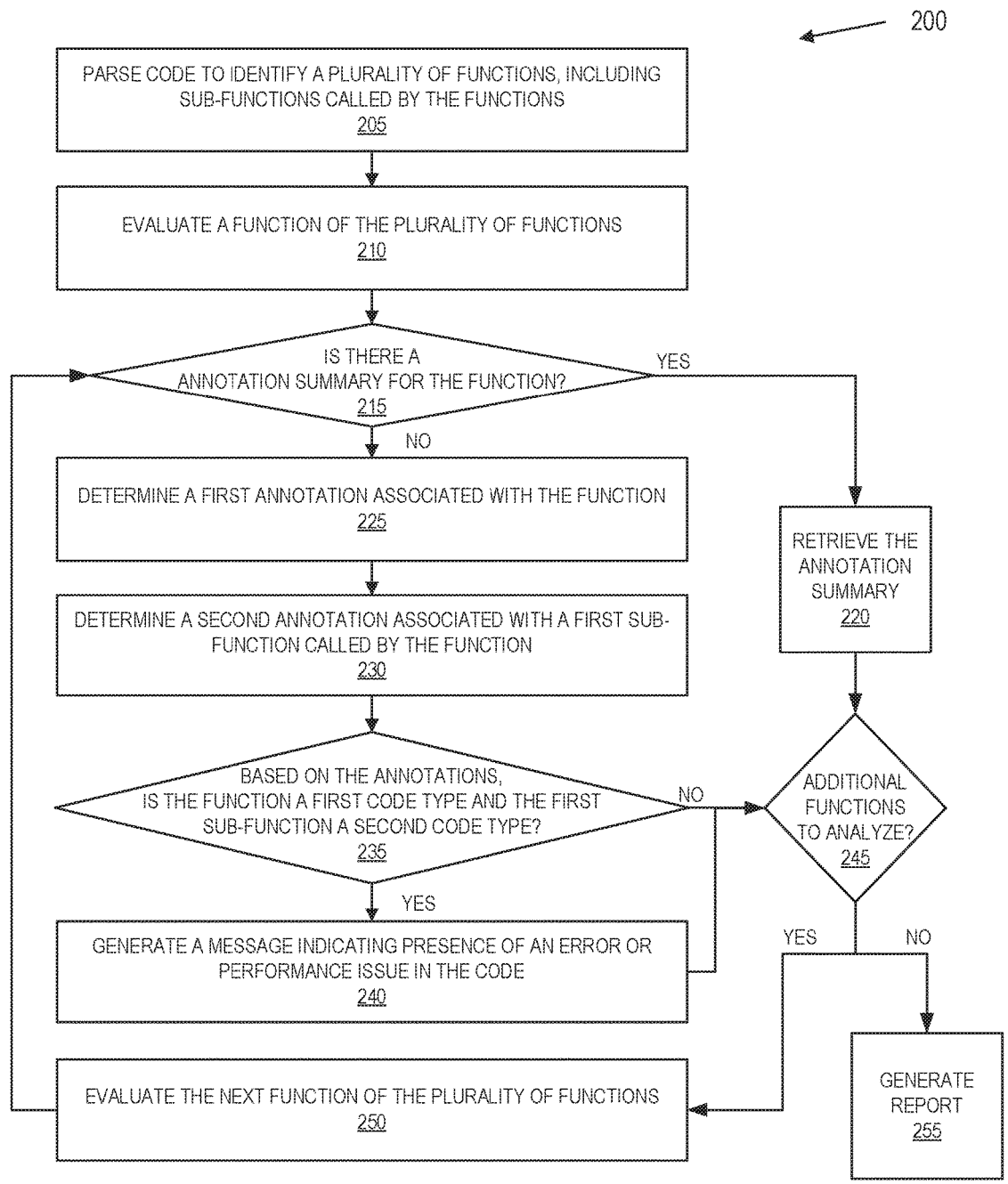
FIG. 2 illustrates an embodiment of a method for analyzing annotated programming code.

FIG. 2 illustrates an embodiment of a method for analyzing annotated programming code. The operations of FIG. 2 will be described with reference to the exemplary embodiment of FIG. 1. However, it should be understood that the operations of FIG. 2 and the other flow diagrams can be performed by embodiments of the invention other than those discussed with reference to FIG. 1.

In embodiments, the analysis of the programming code is performed by a static program analysis system without executing the plurality of functions in the programming code. In some embodiments, this method is performed by one or more servers. In some embodiments, the one or more servers receive and present information via GUIs to end-users. In other embodiments, certain aspects of the method are performed on an end-user device, for example, via an application, browser, etc. In some embodiments, server computer 120 may receive programming code from one of the client devices 104A-104N. In some embodiments, the programming code may be sent to server computer 120 across a network 110 by one of the client devices 104A-104N.

At block 205, server computer 120 parses programming code to identify a plurality of functions contained within the programming code. In some embodiments, as part of parsing the programming code to identify the plurality of functions, server computer 120 also identifies any sub-functions called by the functions.

In some embodiments, prior to parsing the programming code, server computer 120 converts the programming code from a first language format to an intermediate language format. For example, the programming code received by server computer 120 may be in a specific programming language (e.g., Java, Objective C, C), and server computer 120 translates the programming code into a uniform language or another representation for the analysis. For example, separation logic or another abstraction may be used to model functions and function calls. Alternate embodiments perform the following analysis directly on the programming code in its original language, without translation, abstraction, or generating a different representation of the programming code.

At block 210, server computer 120 evaluates a function of the identified plurality of functions. For example, server computer 120 determines the label (e.g., name) of the function and an annotation that may have been designated for the function. In some embodiments, each annotation is stored within the programming code along with its corresponding function. In some embodiments, the annotations for the functions in the programming code may be sent to server computer 120 separately from the programming code itself, e.g., in a separate textual file. In some embodiments, the annotations for the functions may be stored in the client profiles data store 137 and accessed by server computer 120 when the programming code is received from the client device 104A-104N, using a client identifier associated with the client profiles.

At block 215, server computer 120 determines whether there is an annotation summary for the function. As part of the server computer 120 evaluating the functions of the plurality of functions in the code, server computer 120 determines whether the function has been previously analyzed by server computer 120. Server computer accesses function call log 135 and queries function call log 135 with the label of the function to determine if an annotation summary for the function is stored in function call log 135. The annotation summary for the function may have been generated in response to a previous analysis of the function. In some embodiments, server computer 120 also determines whether there are annotation summaries stored for each of the sub-functions called by the function and whether the annotation summary for the function includes the contents of the annotations summaries for each of the sub-functions.

Where function call log 135 contains annotation summaries for the sub-functions called by the function and does not contain an annotation summary for the function itself, a new annotation summary for the function may be generated as described with reference to block 225. In some embodiments, the new annotation summary for the function includes the retrieved annotation summaries for the sub-functions called by the function. An annotation summary for the sub-function contains the summary of function calls made by the sub-function, thereby providing a summary of the sub-function (and any functions called by the sub-function), without requiring server computer 120 to perform an analysis of the sub-function.

In some embodiments, when the annotation summary for the function is stored in function call log 135, server computer 120 may determine whether the function is different from the previous instance of the function analyzed by server computer 120. For example, the current instance of the function may call fewer or additional sub-functions than the previous instance of the function. In such embodiments, server computer 120 may analyze the additional sub-functions in the manner described below, and modify the annotation summary for the function accordingly to include the results of the analysis of the additional sub-functions. Similarly, server computer 120 may reanalyze the function when the function is determined to call fewer sub-functions than the previous instance.

At block 220, if there is an annotation summary for the function, server computer 120 retrieves the annotation summary for the function. For example, if a function labeled "bar" has already been analyzed and an annotation summary created and stored in function call log 135, server computer 120 does not perform another analysis of the function "bar." Server computer 120 continues to block 245 to determine whether there are additional functions to analyze.

In some embodiments, the annotation summary for a function includes a mapping to all sub-functions called by the function, as well as indications of any errors or performance issues related to the function determined by server computer 120 through its analysis of the function, such as those caused by the sub-function calls of the function. The annotation summary may also include identification information for the function, including a function label and location(s) of the function within the programming code.

At block 225, when there is no stored annotation summary for the function, server computer 120 determines a first annotation associated with the function. The first annotation associated with the function may specify a code type for the function. For example, as depicted in FIG. 3A, function "bar" has been annotated with "@performancecritical."

At block 230, when the function calls a first sub-function, server computer 120 determines a second annotation associated with the first sub-function. The second annotation associated with the sub-function may specify a code type for the sub-function. For example, as depicted in FIG. 3A, function "foo," which is called as a sub-function by function "bar," has been annotated with "@expensive."

When the function calls more than one sub-function, server computer 120 determines the annotations associated with each of the sub-functions called by the function. Similarly, when the first sub-function itself calls additional sub-functions, server computer 120 determines the annotations associated with each of the sub-functions called by the first sub-function. For example, server computer 120 may perform portions of method 200 recursively to analyze sub-functions. In such an embodiment, the sub-function is treated as the current function and, e.g., method 200 begins evaluation of the sub-function as described with reference to block 210. As described above, one or more of the sub-functions may have been previously analyzed and server computer 120 uses an existing annotation summary for the corresponding sub-function(s).

At block 235, based on the annotations, server computer 120 determines whether the function is a first code type and the first (or another) sub-function is a second code type. In some examples, the first annotation and the second annotation may be of the same type, while in other examples, the first annotation and the second annotation may be different types.

In some embodiments, there may be three different code types: source, sink, and sanitizer. Rules governing the result from analyses showing one type of the code types calling another type of the code types may be defined by server computer 120, or by the client. In some embodiments, the annotations associated with each code type for the programming code may be unique to a particular client associated with one of client devices 104A-104N. For example, a client associated with client device 104A may provide a predefined and customized set of annotations to server computer 120. This predefined and customized set of annotations establishes how the programming code will be annotated for the client associated with client device 104A. Example annotations may include: performance critical, expensive, free, ignore, no allocation, new, parse, and build. Each annotation designated by the client may be classified by the client into one of the three categories: source, sink, and sanitizer. For example, the client may define "@performancecritical" as a source-type annotation, "@expensive" as a sink-type annotation, and "@free" as a sanitizer-type annotation. The client may define one or more annotations for each code type. Server computer 120 stores the customized set of annotations for the code types in client profiles data store 137. Client profiles data store 137 may be accessed by server computer 120 when server computer 120 receives annotated programming code from client device 104A.

Programming code that includes a source-type function calling a sink-type sub-function results in the generation of an error or warning message. However, when there is an intermediate function call to a sanitizer-type function between the source-type function and the sink-type function, no error or warning message is generated.

In some examples, while a first sub-function called by a function may not be annotated with a sink-type annotation, if that first sub-function itself has a sub-function call to a second sub-function that has a sink-type annotation, an error or warning message may be generated. In such an example, the first sub-function may be treated as a sink-type function based on inheriting the annotation of the second sub-function and the first sub-function not being annotated with a sanitizer-type annotation.

At block 240, if the function is the first code type and the first sub-function is the second code type, server computer 120 generates an error message. The error message indicates the presence of an error in the programming code or that the programming code will create a performance issue. For example, a performance issue may be determined where a function call requires the allocation of an amount of memory or computing resources above a predetermined threshold or outside of a specified target range. Server computer 120 generates the error message in an annotation summary for the function in response to determining that the first annotation associated with the function specifies the function as the first code type and the second annotation associated with the sub-function called by the function specifies the sub-function as the second code type. The annotation summary for the function is stored in function call log 135.

In one example, the error message in the annotation summary for the function indicates that execution of the sub-function having the second code type by the function having the first code type will negatively impact performance of a computer system executing the code. For example, when the first code type indicates the function is annotated with a source-type annotation (e.g., "@performancecritical"), and the second code type indicates the sub-function called by the function is annotated with a sink-type annotation (e.g., "@expensive"), the error message generated in the annotation summary for the function indicates that a performance critical function is calling an expensive function that requires an allocation of memory above a threshold.

In another example, when a function annotated with "@noallocation," (e.g., prohibiting the allocation of memory or computer resources), calls a sub-function annotated with "@new," (e.g., memory or resource-allocating) an error message is generated. An error is generated to indicate that a function that is not allowed to allocate additional memory is calling a sub-function that includes the allocation of additional memory.

In another example, when there is an intermediate function called as a sub-function by a function, between the function with a source-type annotation and the sub-function with a sink-type annotation, and the intermediate function is a sanitizer-type function, no error or warning is reported.

In some embodiments, as part of generating the annotation summary for the function, server computer 120 generates a mapping from the function to the sub-function, and stores the mapping in the annotation summary for the function.

At block 245, server computer 120 determines whether there are additional functions in the programming code remaining to be analyzed.

At block 250, when there are additional functions to analyze, server computer 120 evaluates the next function in the plurality of functions and returns to block 215. Server computer 120 evaluates the remaining functions in the plurality of functions in the manner described above.

At block 255, when there are no additional functions to analyze, server computer 120 completes its analysis of the programming code and generates a report. In some embodiments, the report generated by server computer 120 contains a list of any errors or performance issues found in the programming code (e.g., the error messages generated at block 240). In other embodiments, the report contains all of the annotation summaries for the functions in the programming code, retrieved and aggregated by server computer 120. In some embodiments, the report may be a separate document or file from the programming code. In alternative embodiments, the report is a modified version of the programming code with the errors and warnings generated by server computer 120 integrated within the programming code. For example, each error or warning message may be inserted into the programming code at the location in the programming code where the error or performance issue was determined by server computer 120. In some embodiments, the report generated by server computer 120 is sent to the corresponding client device 104A-104N that sent the programming code to server computer 120. The report may be sent through the network 110 using the message server 124.

Figure 3C:

FIGS. 3A-C illustrate exemplary annotated programming code for analysis by server computer 120. In the examples illustrated in FIGS. 3A-C, a client has designated the annotation "@performancecritical" as a source function, the annotation "@expensive" as a sink function, and the annotation "@free" as a sanitizer function. FIGS. 3A-C depict one example of a way of annotating programming code. In other embodiments, the designation of the annotations may be specified in a different location within the programming code, or separate from the programming code. For example, the annotations for functions may be contained in a table, library, or another file associated with the programming code. In addition, the textual format of the annotation may be defined and specified in different ways than depicted in FIGS. 3A-C.

FIG. 3A depicts two functions contained in an exemplary portion of programming code 300. In this example, the portion of programming code 300 includes a performance critical function 302 and an expensive function 304. The performance critical function 302 is labeled "void bar," and includes a function call to expensive function 304, labeled "object foo."

Server computer 120, upon identifying the function "bar," may access function call log 135 to determine whether a stored annotation summary for "bar" is present. In some embodiments, an annotation summary for "bar" may be present if the programming code included a previous instance of the function "bar" and an analysis of the previous instance of "bar" was performed. If there is no stored annotation summary for "bar," server computer 120 analyzes function "bar." Server computer 120 determines that function "bar" includes a sub-function call to one or more sub-functions. In some embodiments, server computer 120 determines the sub-functions called by the function when server computer 120 initially parses the programming code to identify the functions located in the programming code. In other embodiments, server computer 120 determines the sub-functions called by the function when the function is analyzed. In the example in FIG. 3A, server computer 120 determines that "bar" calls "foo" as a sub-function and determines if there is a stored annotation summary for "foo." If there is not a stored annotation summary for "foo," server computer 120 determines the first annotation associated with the function "bar" and a second annotation associated with sub-function "foo" called by "bar." Based on the determination of the first annotation as a source-type annotation (e.g., @performancecritical) and the second annotation as a sink-type annotation (e.g., @expensive), server computer 120 generates an error message for function "bar." Server computer 120 generates an annotation summary for function "bar" to include the error message. In some embodiments, the error message may indicate that a performance critical function is calling an expensive function, because function "bar" is calling function "foo," which requires an allocation of memory or another use of computation resources above a predetermined threshold or outside a target range. The error message may also be generated if function "foo" calls a sub-function that is a sink-type annotation.

FIG. 3B depicts three functions contained in an exemplary portion of programming code 310. In this example, the portion of programming code 310 includes a performance critical function 312, a free function 314, and an expensive function 316. The performance critical function 312 is labeled "object bar," which includes a function call to free sub-function 314, labeled "object baz," which includes a function call to expensive function 316, labeled "object foo."

Server computer 120, upon identifying the function "bar," may access function call log 135 to determine whether a stored annotation summary for "bar" is present. If there is no stored annotation summary, server computer 120 determines the first annotation associated with the function "bar," a second annotation associated with a sub-function "baz" called by the function "bar," and a third annotation associated with the sub-function "foo" called by the sub-function "baz." As described previously, with respect to FIG. 3A, when a source-type function calls a sink-type function, an error is generated. In the example of FIG. 3B, however, when there is an intermediate function categorized as a sanitizer-type function, such as "baz," between the source-type function and the sink-type function, no error message is generated. In some embodiments, server computer 120 may generate an annotation summary for function "bar" to maintain the mapping of function calls made by function "bar" and function called made by sub-functions of function "bar," but the annotation summary may not include an error message.

In other examples, a sanitizer-type function calling a source-type function, as well as a source-type function calling an unannotated function, may not cause server computer 120 to generate an error message for the function.

FIG. 3C depicts two functions contained in an exemplary portion of programming code 320. In this example, a first programming code portion 322 contains a class labeled "SuperClass" which contains a function call to unannotated function "bar" 324. A second programming code portion 326 contains a class labeled "SubClass," which is a subclass of "SuperClass," and which contains a function call to function "bar" 328. Function "bar" 328 is annotated with "@expensive."

In analyzing the portion of programming code 320, server computer 120 determines that a first instance of the function "bar" in a class has a mismatching annotation from a second instance of the function "bar" in a subclass of the class. In the example of FIG. 3C, the first instance is unannotated and the second instance is annotated as "expensive." In response to determining that there is a mismatching annotation between the first and second instances of the function, server computer 120 generates a mismatch error message for the function. The mismatch error message may be stored in an annotation summary for the function retrieved from the function call log 135, or a new annotation summary for the function may be generated. In one embodiment, when a subclass is annotated with or includes a sink-type annotation, a non-annotated or otherwise conflicting superclass is treated as being annotated with or including a sink-type annotation, e.g., in the analysis described above with reference to method 200.

Figure 4:
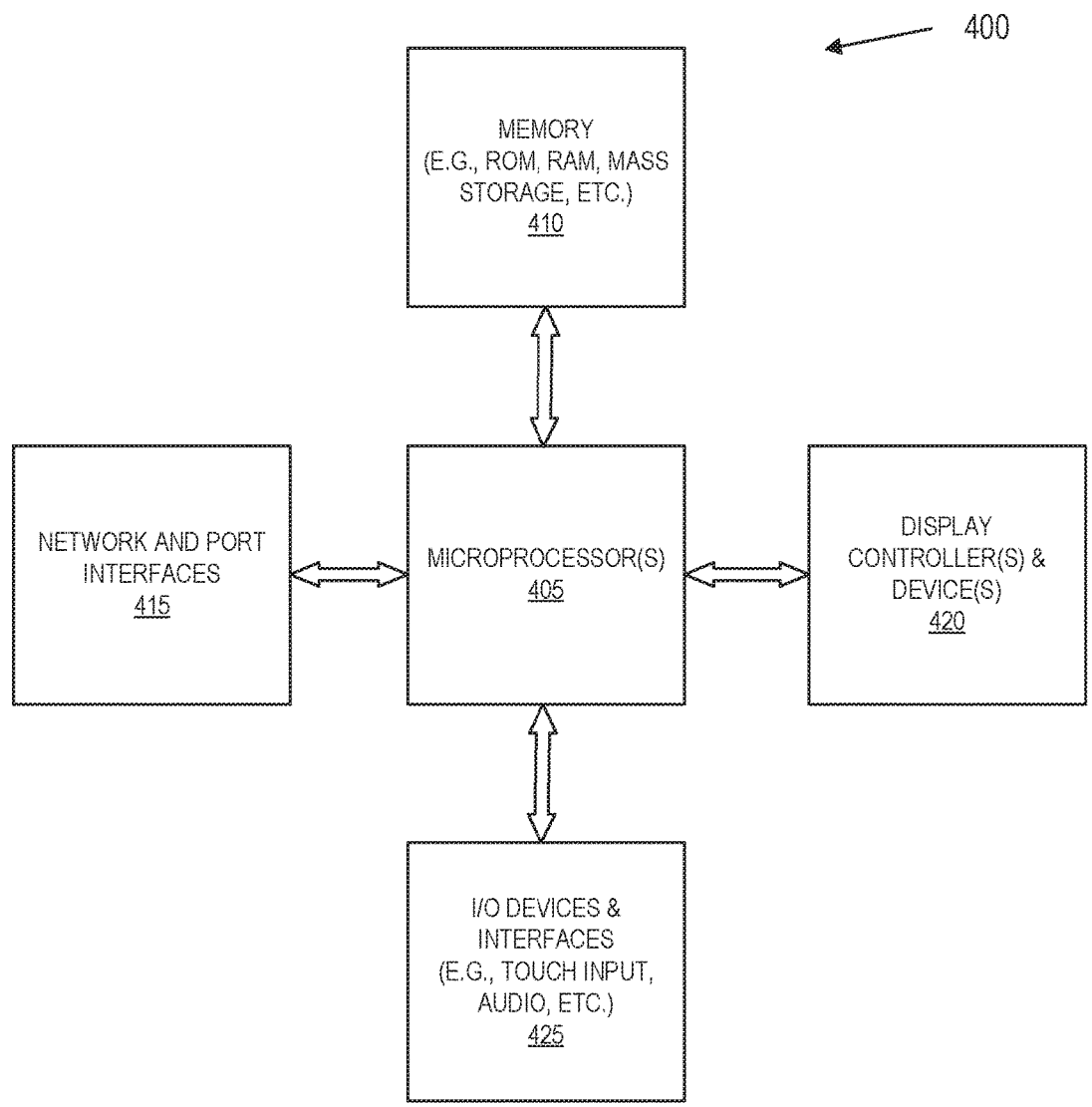
FIG. 4 illustrates, in block diagram form, an exemplary processing system to perform annotated programming code analysis.

FIG. 4 illustrates, in block diagram form, an exemplary processing system to perform annotated programming code analysis. In some embodiments, this is a high-level view of client devices 104A-N and/or server computer 120, or components thereof. Data processing system 400 includes one or more microprocessors 405 and connected system components (e.g., multiple connected chips). Alternatively, data processing system 400 is a system on a chip.

Data processing system 400 includes memory 410, which is coupled to microprocessor(s) 405. Memory 410 may be used for storing data, metadata, and programs for execution by the microprocessor(s) 405 including the modules and engines detailed above. For example, memory 410 may include one or more of the data stores 130 and/or may store modules described herein. Memory 410 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 410 may be internal or distributed memory.

Data processing system 400 includes network and port interfaces 415, such as a port, connector for a dock, or a connector for a USB interface, FireWire, Thunderbolt, Ethernet, Fibre Channel, etc. to connect data processing system 400 with another device, external component, or a network. Exemplary network and port interfaces 415 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 400 with another device, external component, or a network and receive stored instructions, data, tokens, etc.

Data processing system 400 also includes display controller and display device 420 and one or more input or output ("I/O") devices and interfaces 425. Display controller and display device 420 provides a visual user interface for the user. I/O devices and interfaces 425 allow a user to provide input to, receive output from, and otherwise transfer data to and from the system. I/O devices and interfaces 425 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses may be used to interconnect the various components shown in FIG. 4.

Data processing system 400 is an exemplary representation of one or more of the systems described above. Data processing system 400 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 400 may be a network computer, server, or an embedded processing device within another device or consumer electronic product. As used herein, the terms computer, device, system, processing system, processing device, and "apparatus comprising a processing device" may be used interchangeably with data processing system 400 and include the above-listed exemplary embodiments.

Additional components, not shown, may also be part of data processing system 400, and, in certain embodiments, fewer components than that shown in FIG. 4 may also be used in data processing system 400. It will be apparent from this description that aspects of the inventions may be embodied, at least in part, in software. That is, the computer-implemented method(s) detailed herein may be carried out in a computer system or other data processing system 400 in response to its microprocessor 405 executing sequences of instructions contained in a memory, such as memory 410 or other non-transitory machine-readable storage medium. The software may further be transmitted or received over a network (not shown) via network and port interfaces 415. In various embodiments, hardwired circuitry may be used in combination with the software instructions to implement the present embodiments. Thus, the techniques are not limited to any specific combination of hardware circuitry and software, or to any particular source for the instructions executed by data processing system 400.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
   storing, in a profiles data store included in a memory of a computer, a profile including annotations for code and associated code types for each of the annotations;
   receiving, by the computer, annotated code; and
   prior to executing the annotated code:
   parsing, by the computer, the annotated code to identify a plurality of functions, each function of the plurality of functions in the annotated code having an associated function label and an associated annotation;
   identifying, by the computer, a calling function included in the plurality of functions, the calling function having an associated first function label and an associated first annotation;
   determining, by the computer, that the calling function calls a first sub-function, the first sub-function having an associated second function label and an associated second annotation;

querying, by the computer, a function call log included in the memory of the computer, the query using the first function label associated with the calling function;

determining, by the computer, if an annotation summary for the calling function is stored in the function call log based on a result of the query;

based on the result of the query indicating that an annotation summary is not stored in the function call log for the calling function, analyzing, by the computer, the calling function comprising:

accessing the profile, the accessing comprising:
associating a first code type with the calling function based on the first code type being associated with the first annotation; and
associating a second code type with the first sub-function based on the second code type being associated with the second annotation; and identifying an issue with execution of the annotated code, the issue based on rules governing the calling function of the first code type calling the first sub-function of the second code type;

generating, by the computer, an annotation summary for the calling function, the annotation summary including an error message based on the identified issue; and storing, by the computer, the annotation summary in the function call log for the calling function.

2. The computer-implemented method of claim 1, further comprising, based on the result of the query indicating that an annotation summary is stored in the function call log for the calling function, retrieving the stored annotation summary for the calling function.

3. The computer-implemented method of claim 1, further comprising:
determining that the calling function is called as a sub-function by a second function; and
generating a second annotation summary for the second function, the second annotation summary including the stored annotation summary for the calling function called as the sub-function by the second function.

4. The computer-implemented method of claim 1, wherein the function call log stores a plurality of annotation summaries for the plurality of functions in the annotated code.

5. The computer-implemented method of claim 1,
wherein the annotated code is received from a computing device; and
wherein execution, by the computing device, of the annotated code including the calling function negatively impacts performance of the computing device due to the identified issue.

6. The computer-implemented method of claim 1, further comprising converting the annotated code from a first language format to an intermediate language format prior to parsing the annotated code.

7. The computer-implemented method of claim 1,
wherein the method further comprises determining, by the computer, that the calling function calls a second sub-function as an intermediate function call between the calling function and the first sub-function, the second sub-function having an associated third function label and an associated third annotation;

wherein accessing the profile further comprises associating a third code type with the second sub-function based on the third code type being associated with the third annotation;

wherein analyzing the calling function further comprises not identifying a potential issue when the annotated code is executed based on rules governing the calling function of the first code type calling the second sub-function of the third code type and based on rules governing the second sub-function of the third code type calling the first sub-function of the second code type; and wherein the annotation summary for the calling function does not include an error message.

8. The computer-implemented method of claim 1, wherein generating the annotation summary for the calling function further comprises:
generating a mapping from the calling function to the first sub-function; and
storing the mapping in the annotation summary.

9. The computer-implemented method of claim 1, further comprising:
determining that a first instance of the calling function in a class has a mismatching annotation from a second instance of the calling function in a subclass of the class; and
generating a mismatch error message for the calling function in the annotation summary for the calling function in response to determining that the first instance of the calling function in the class has the mismatching annotation from the second instance of the calling function in the subclass of the class.

10. The computer-implemented method of claim 1,
wherein when the first code type indicates the calling function is performance critical,
wherein when the second code type indicates the first sub-function is expensive, and
wherein the error message included in the annotation summary for the calling function indicates that a performance critical function is calling an expensive function that requires an allocation of memory above a threshold.

11. The computer-implemented method of claim 1, wherein a static program analysis system included in the computer parses the annotated code and generates the annotation summary.

12. The computer-implemented method of claim 1,
wherein when the first code type indicates the calling function is non-allocating, a non-allocating function prohibiting allocation of memory,
wherein the second code type indicates the first sub-function is memory-allocating, and
wherein the error message indicates that the non-allocating function is calling a memory-allocating function that requires an allocation of memory.

13. A non-transitory computer-readable medium storing instructions which, when executed by one or more processors in a processing device, cause the processing device to perform a method comprising:
storing, in a profiles data store included in a memory, a profile including annotations for code and associated code types for each of the annotations;
receiving, by the processing device, annotated code; and
prior to executing the annotated code:
parsing the annotated code to identify a plurality of functions, each function of the plurality of functions in the annotated code having an associated function label and an associated annotation;

identifying a calling function included in the plurality of functions, the calling function having an associated first function label and an associated first annotation;

determining that the calling function calls a first sub-function, the first sub-function having an associated second function label and an associated second annotation;

querying a function call log included in the memory, the query using the first function label associated with the calling function;

determining if an annotation summary for the calling function is stored in the function call log based on a result of the query;

based on the result of the query indicating that an annotation summary is not stored in the function call log for the calling function, analyzing the calling function comprising:

accessing the profile, the accessing comprising:

associating a first code type with the calling function based on the first code type being associated with the first annotation; and associating a second code type with the first sub-function based on the second code type being associated with the second annotation; and identifying an issue with execution of the annotated code, the issue based on rules governing the calling function of the first code type calling the first sub-function of the second code type;

generating an annotation summary for the calling function, the annotation summary including an error message based on the identified issue; and storing the annotation summary in the function call log for the calling function.

14. The non-transitory computer-readable medium of claim 13, further comprising, based on the result of the query indicating that an annotation summary is stored in the function call log for the calling function, retrieving the stored annotation summary for the calling function.

15. The non-transitory computer-readable medium of claim 14, further comprising:

determining that the calling function is called as a sub-function by a second function; and generating a second annotation summary for the second function, the second annotation summary including the stored annotation summary for the calling function called as the sub-function by the second function.

16. The non-transitory computer-readable medium of claim 13, wherein the method further comprises determining that the calling function calls a second sub-function as an intermediate function call between the calling function and the first sub-function, the second sub-function having an associated third function label and an associated third annotation;

wherein accessing the profile further comprises associating a third code type with the second sub-function based on the third code type being associated with the third annotation;

wherein analyzing the calling function further comprises not identifying a potential issue when the annotated code is executed based on rules governing the calling function of the first code type calling the second sub-function of the third code type and based on rules governing the second sub-function of the third code type calling the first sub-function of the second code type; and wherein the annotation summary for the calling function does not include an error message.

17. The non-transitory computer-readable medium of claim 13, further comprising:

determining that a first instance of the calling function in a class has a mismatching annotation from a second instance of the calling function in a subclass of the class;

determining that the first instance of the calling function has a mismatching annotation from the second instance of the calling function; and generating a mismatch error message for the calling function in the annotation summary for the calling function in response to determining that the first instance of the calling function has the mismatching annotation from the second instance of the calling function.

18. The non-transitory computer-readable medium of claim 13, wherein when the first code type indicates the calling function is performance critical, wherein when the second code type indicates the first sub-function is expensive, and wherein the error message included in the annotation summary for the calling function indicates that a performance critical function is calling an expensive function that requires an allocation of memory above a threshold.

19. The non-transitory computer-readable medium of claim 13, wherein when the first code type indicates the calling function is non-allocating, a non-allocating function prohibiting allocation of memory, wherein the second code type indicates the first sub-function is memory-allocating, and wherein the error message indicates that the non-allocating function is calling a memory-allocating function that requires an allocation of memory.

20. An apparatus comprising:

a processing device; and a memory coupled to the processing device, the memory storing instructions which, when executed by the processing device, cause the apparatus to:

store, in a profiles data store included in the memory, a profile including annotations for code and associated code types for each of the annotations;

receive, by the processing device, annotated code; and prior to executing the annotated code:

parse the annotated code to identify a plurality of functions each function of the plurality of functions in the annotated code having an associated function label and an associated annotation;

identify a calling function included in the plurality of functions, the calling function having an associated first function label and an associated first annotation;

determine that the calling function calls a first sub-function the first sub-function having an associated second function label and an associated second annotation;

query a function call log included in the memory, the query using the first function label associated with the calling function;

determine if an annotation summary for the calling function is stored in the function call log based on a result of the query;

based on the result of the query indicating that an annotation summary is not stored in the function call log for the calling function, analyze the calling function comprising:

accessing the profile, the accessing comprising:
      associating a first code type with the calling function based on the first code type being associated with the first annotation; and
      associating a second code type with the first sub-function based on the second code type being associated with the second annotation; and identifying an issue with execution of the annotated code, the issue based on rules governing the calling function of the first code type calling the first sub-function of the second code type;

generate an annotation summary for the calling function, the annotation summary including an error message based on the identified issue; and store the annotation summary in the function call log for the calling function.

\* \* \* \* \*

UNITED STATES PATENT AND TRADEMARK OFFICE
CERTIFICATE OF CORRECTION

PATENT NO. : 10,409,707 B2  
APPLICATION NO. : 15/268054  
DATED : September 10, 2019  
INVENTOR(S) : Jeremy Emilien Georges Dubreil et al.

Page 1 of 1

It is certified that error appears in the above-identified patent and that said Letters Patent is hereby corrected as shown below:

In the Claims

In Column 16, Lines 61-62, Claim 20, delete "sub-function" and insert -- sub-function, --, therefor.

Signed and Sealed this  
Twenty-second Day of October, 2019

Andrei Iancu  
*Director of the United States Patent and Trademark Office*